July 2, 1940.  A. J. JOHN  2,206,569
FISHING APPLIANCE
Filed March 13, 1939

Inventor:
Albert J. John
By: Brayton Richards
Attorney.

Patented July 2, 1940

2,206,569

UNITED STATES PATENT OFFICE 2,206,569

FISHING APPLIANCE

Albert J. John, Brookfield, Ill.

Application March 13, 1939, Serial No. 261,540

1 Claim. (Cl. 43—27)

The invention relates to improvements in fishing appliances and has for its primary object the provision of an improved weight or sinker member adapted to ride or run upon a heavier line and carry a lighter fishing line out from shore into deep water, the primary object of the present invention being the provision of an improved construction of the character indicated which may be readily attached to or removed from the heavier line after the same has been stretched.

Other objects will appear hereinafter.

The invention consists in the combinations and arrangements of parts hereinafter described and claimed.

The invention will be best understood by reference to the accompanying drawing forming a part of this specification and in which.

Figure 2:
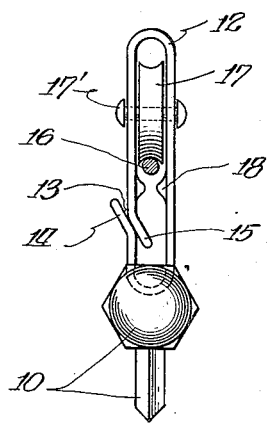
Fig. 2 is an end view of the same.
Figure 3:
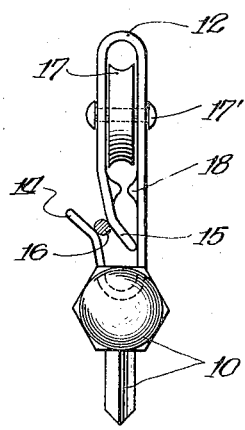

Fig. 3 a view similar to Fig. 2 but showing the parts of the appliance in the positions assumed when the same is being attached to a stretched line.

Figure 1:
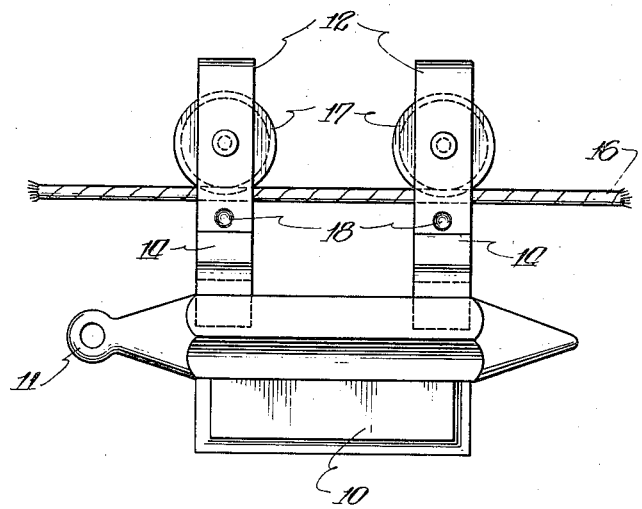
Fig. 1 is a side view of an appliance embodying the invention.

The embodiment of the invention illustrated in Figs. 1, 2 and 3 comprises a lead weight 10 and frames 11 and 12, each preferably consisting of a looped strip of spring metal having its lower end embedded in the weight 10 and provided with a line entry opening 13 at one side thereof, the said opening being formed between the ends 14 and 15 of the strip from which each frame is made, bent as shown to abut each other and thereby form guide lips as best indicated in Fig. 3, wherein the heavier line 16 is shown as being inserted through the openings or gaps 13. As will be noted, the lower portion of each frame member, at the opening, overlaps the upper portion on the outside and thereby reinforces the same under strain to prevent outward springing thereof. Each of the frames 12 carries a grooved wheel or pulley which will run upon and be supported by the heavier line 16, as will be readily understood by those skilled in this art. Guide projections 18 in the form of beads are struck inwardly from the inner sides of each of the frames 12 and serve to guide the line 16 into engagement with the corresponding wheel 17 and also serve to prevent accidental displacement thereof. As will be noted, the rivet 17' on which the corresponding wheel 17 is mounted is somewhat longer than the extreme width of the corresponding frame 12 so as to provide freedom in the connection to facilitate the entry of the line through the opening 13 as will be readily understood.

By this arrangement a simple and effective fishing appliance of the character indicated and commonly known as a "trolley" will be provided which may be readily applied to or removed from the fishing line 16 after said line has been properly stretched and placed in position. The specific form and arrangement of parts constitutes a simple and effective one for the purpose.

While I have illustrated and described the preferred forms of construction for carrying my invention into effect, these are capable of variation and modification without departing from the spirit of the invention. I, therefore, do not wish to be limited to the precise details disclosed, but desire to avail myself of such variations and modifications as fall within the scope of the appended claim.

I claim:

A device of the class described comprising a spring frame member having a normally closed entry opening therein, said frame member being constructed and arranged to be sprung by pressure to open said opening sufficiently for the entry of a line and automatically closing said opening by the spring action of said frame member upon relief of said pressure; and a supporting element in said frame arranged to move upon and be supported by a line.

ALBERT J. JOHN.